United States Patent [19]
Kamen

[11] Patent Number: 5,160,689
[45] Date of Patent: Nov. 3, 1992

[54] APPARATUS AND METHOD FOR MANUFACTURING COSMETIC PRODUCTS

[75] Inventor: Melvin E. Kamen, Highlands, N.J.

[73] Assignee: Revlon Consumer Products Corporation, New York, N.Y.

[21] Appl. No.: 615,750

[22] Filed: Nov. 16, 1990

[51] Int. Cl.$^5$ .................... B29C 33/64; B29C 45/00
[52] U.S. Cl. .................... 264/297.8; 249/80; 249/81; 249/115; 249/121; 249/133; 249/134; 264/22; 264/81; 264/83; 264/39; 264/338; 425/803; 425/DIG. 32
[58] Field of Search .................... 425/DIG. 32, 803; 249/115, 135, 120, 121, 80, 81, 133, 134; 264/130, 131, 134, 297.8, 338, 39, 81, 83, 22; 427/34

[56] References Cited

U.S. PATENT DOCUMENTS

| | | | |
|---|---|---|---|
| 873,073 | 12/1907 | Nedfors | 425/803 |
| 2,192,675 | 3/1940 | Ferentzy | 264/297.8 |
| 2,285,149 | 6/1942 | D'Arcey | 249/120 |
| 2,468,539 | 4/1949 | Berger | 425/803 |
| 2,932,386 | 4/1960 | Ushkow | 425/DIG. 32 |
| 4,624,810 | 11/1986 | Sisbarro | 264/25 |

FOREIGN PATENT DOCUMENTS 61-83232  4/1986  Japan .................... 427/34

Primary Examiner—Jeffery Thurlow
Assistant Examiner—Mathieu Vargot
Attorney, Agent, or Firm—Julie Blackburn

[57] ABSTRACT

A multiple cavity mold for lipstick products includes a plurality of receptacles. Each receptacle has an inner cavity and an outer surface that is exposed such that a coolant, which is circulated about the receptacle, causes a cosmetic melt contained therein to solidify.

17 Claims, 4 Drawing Sheets

APPARATUS AND METHOD FOR MANUFACTURING COSMETIC PRODUCTS

FIELD OF THE INVENTION

The present invention relates to an apparatus and a method for manufacturing cosmetic products, and, more particularly, to a polymeric multi-cavity mold and a method of using such mold to manufacture lipstick.

BACKGROUND OF THE INVENTION

Cosmetic products in stick form, such as lipstick, have been manufactured for many years by a variety of molding processes and equipment. Of particular interest is Ferentzy U.S. Pat. No. 2,192,675, which discloses an apparatus and method of manufacturing lipstick products. The apparatus includes a metal mold that forms a gang of lipsticks. The mold includes a lower section, which forms the bodies of the lipstick products, and an upper section, which forms the butt ends of the lipstick bodies. The lower section contains three rows of cavities. Each cavity is cylindrical or tapered slightly. The lower section can be split lengthwise for cleaning purposes. The upper section is provided with a plurality of apertures. When the upper section is mounted on top of the lower section, the apertures in the upper section align with the cavities in the lower section. The apparatus also includes a work table having a conveyor belt that transports the mold to different stations. These stations include a filling station, a cooling station, a disassembly and fitting station and a heating station. To manufacture lipstick in accordance with the Ferentzy patent, a cosmetic melt is discharged onto the upper section of the mold and allowed to flow down into the cavities provided in the lower section of the mold. After the cavities have been filled, excess cosmetic melt is removed from the upper section of the mold. Next, at the cooling station, the cosmetic melt contained in the mold is cooled and solidified. Once the melt contained within the mold has solidified into a plurality of lipsticks, the upper section of the mold is removed, thereby exposing the butt ends of the lipstick products. A plurality of lipstick holders fitted to a centering frame are lowered and pressed onto the exposed butt ends of the lipstick products. As the centering frame is raised, the lipstick products are withdrawn from the mold. Finally, at the heating station, the lipstick products are heat glazed to remove the defects caused by their removal from the mold.

As noted above, the Ferentzy mold is made of metal. A cosmetic mold made of metal is desirable because metal provides a good conductor of heat and, therefore, removes heat from the cosmetic melt. Furthermore, metal molds are structurally strong to permit handling and provide an extended life, and their molding surfaces can be polished to enhance release of solidified cosmetic product. However, there are disadvantages to a metal mold. Metal is expensive. Further, a metal mold is heavy, and can be difficult to fabricate.

SUMMARY OF THE INVENTION

The problems and disadvantages associated with the prior art devices discussed above are overcome in accordance with the present invention by providing a new and improved multiple cavity mold adapted to form a plurality of cosmetic products, such as lipstick. More particularly, the new and improved mold comprises a base having a substantially hollow interior chamber and a plurality of receptacles depending from the base and extending into the interior chamber thereof. Each of the receptacles has an inner surface, which forms a cavity for forming at least a major portion of a cosmetic product, and an outer surface, which is exposed to the interior chamber of the base. Accessing means, such as an opening in the base, permits a coolant to enter the interior chamber of the base and to contact the outer surfaces of the receptacles.

The new and improved mold is especially adapted for use in connection with a unique method for manufacturing a plurality of cosmetic products, such as lipstick. The unique method comprises the steps of (i) filling each cavity of the mold with a quantity of cosmetic melt; (ii) flowing a coolant past each cavity of the mold until the cosmetic melts solidify and form a plurality of cosmetic products; and (iii) removing the cosmetic products from the mold.

BRIEF DESCRIPTION OF THE DRAWINGS

For a better understanding of the present invention, reference is made to the following detailed description of two exemplary embodiments considered in conjunction with the accompanying drawings, in which.

DETAILED DESCRIPTION OF THE EXEMPLARY EMBODIMENTS

While the present invention may be used for manufacturing any type of cosmetic product, it is especially useful for manufacturing lipstick. Accordingly, the present invention will be described in connection with the manufacture of lipstick.

Figure 1:
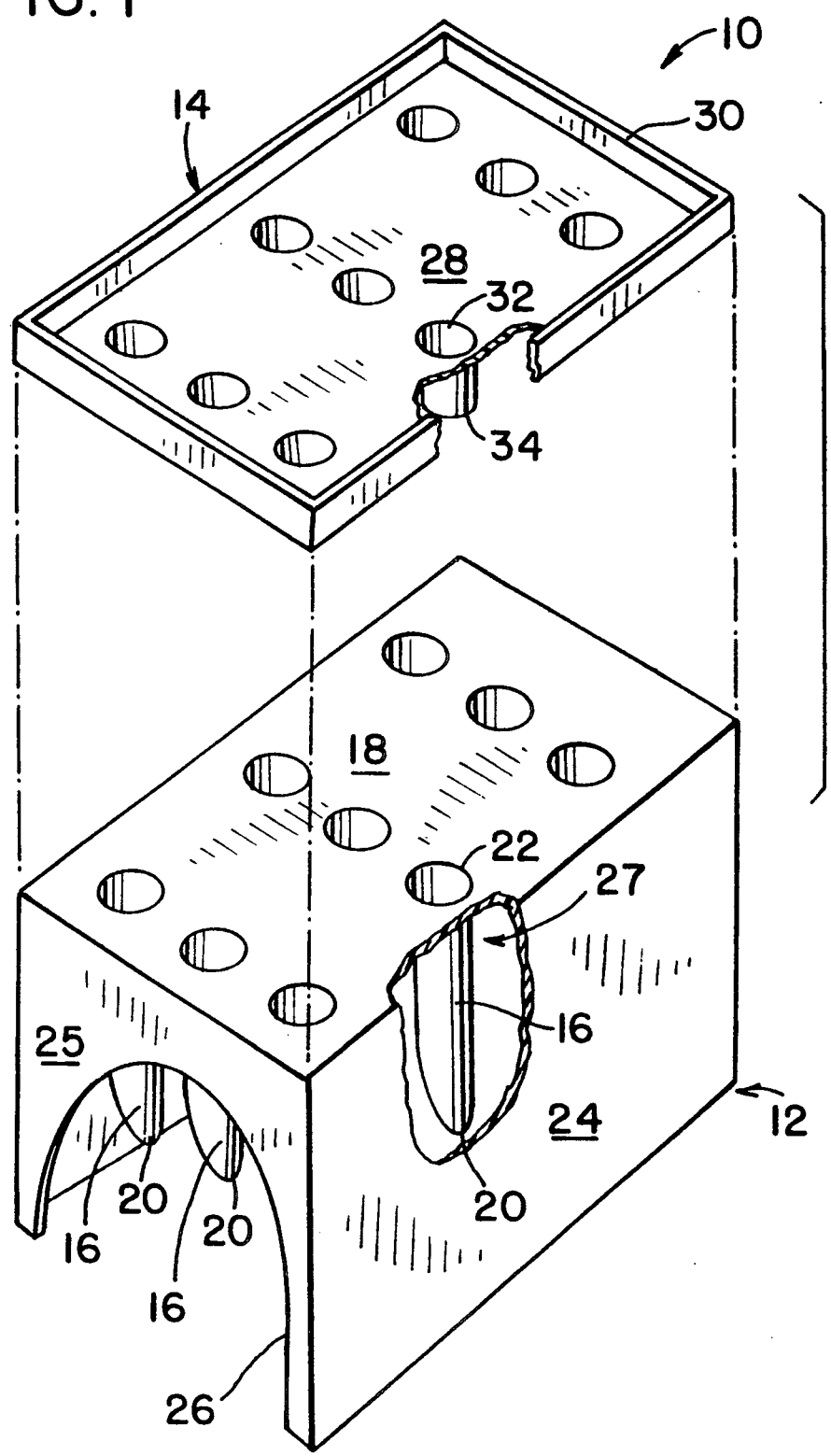
FIG. 1 is an exploded, perspective view of a multiple cavity lipstick mold constructed in accordance with an exemplary embodiment of the present invention.

Referring to FIG. 1, there is shown a multiple cavity lipstick mold 10 having a base 12, which forms a gang of lipstick bullets, and a cap section 14, which forms butt ends for the gang of lipstick bullets. The base 12 includes a plurality of receptacles 16 depending from a base plate 18. Each receptacle 16 has a tubular shape, an open end and a closed end, which forms a tip 20, and a cavity 21 (see FIG. 2). The open ends of the receptacles 16 communicate with matching apertures 22 formed in the base plate 18. The tip 20 of each receptacle 16 is distal to the base plate 18. While cylindrical receptacles 16 with oblique tips 20 are shown, the receptacles 16 could be made with any desired cross-sectional shape, such as a hexagon or an oval. Similarly, the tips 20 could have any desired shape. Because the receptacles 16 have a monolithic (i.e., one piece) construction, lipstick products formed thereby are seamless.

The base 12 further includes a pair of side members 24 and a pair of end members 25 which, with the base plate 18, form a hollow interior chamber 27. Each side member 24 is solid, and each end member 25 has an access opening 26 therein for permitting a coolant, such as air, a refrigerant gas or a chilled fluid, to flow into and through the chamber 27 for a purpose which will be described hereinafter. The access openings 26 could be provided in the side members 24, instead of in the end members 25. Also, both the side members 24 and the end members 25 could be provided with the access openings 26. If the open bottom of the chamber 27 is allowed to function as an access opening, then the access openings 26 can be eliminated from the side members 24 and/or the end members 25.

The receptacles 16 are located in the chamber 27. When the coolant enters the chamber 27, it flows around the receptacles 16. The receptacles 16 are spaced apart such that the outer surface of each receptacle 16 is fully exposed to the coolant. The side members 24 and the end members 25 also function to increase exposure to the coolant by spacing the tips 20 of the receptacles 16 away from the surface upon which the mold 10 sits. Thus, the mold 10 overcomes the heat conductivity limitations of plastic by exposing a large surface area of the receptacles 16 to the coolant.

The cap section 14 includes a face plate 28 that is surrounded by a peripheral lip 30 which extends away from the base plate 18. A plurality of bores 32 correspond one-to-one with the plurality of apertures 22 on the base plate 18. Each bore 32 extends through the face plate 28. A plurality of tubular projections 34, which correspond one-to-one with the plurality of bores 32 on the face plate 28, depend from the face plate 28. The receptacles 16 are dimensioned to permit the projections 34 of the cap section 14 to be slideably received therein.

The base 12 and the cap section 14 are of monolithic construction. Each is preferably formed from a plastic polymer such as a polyalkylene having between two and eight carbon atoms, polyamide, styrenic, polyacetal polycarbonate, polyacrylate, polysulfone, polyester, cellulosic, cross linked polymer, thermosetting resin and other thermoplastic formed by a vacuum molding process.

Figure 2:
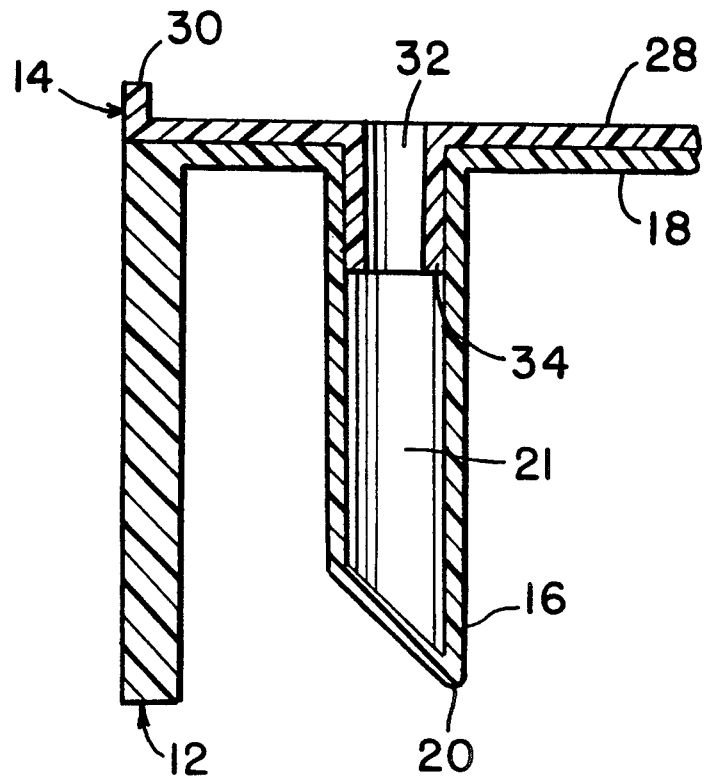
FIG. 2 is a cross-sectional view of a portion of the multiple cavity lipstick mold illustrated in FIG. 1.

Referring to FIG. 2, the cap section 14 is properly positioned on the base 12 of the mold 10 by the registration of the tubular projections 34 with the open ends of their corresponding receptacles 16. The cavities 21 of the receptacles 16 are tapered to facilitate the disassembly of the mold 10 (i.e., removal of the cap section 14 from the base 12) and the release of the molded lipstick product from the base 12 of the mold 10.

Figure 3:
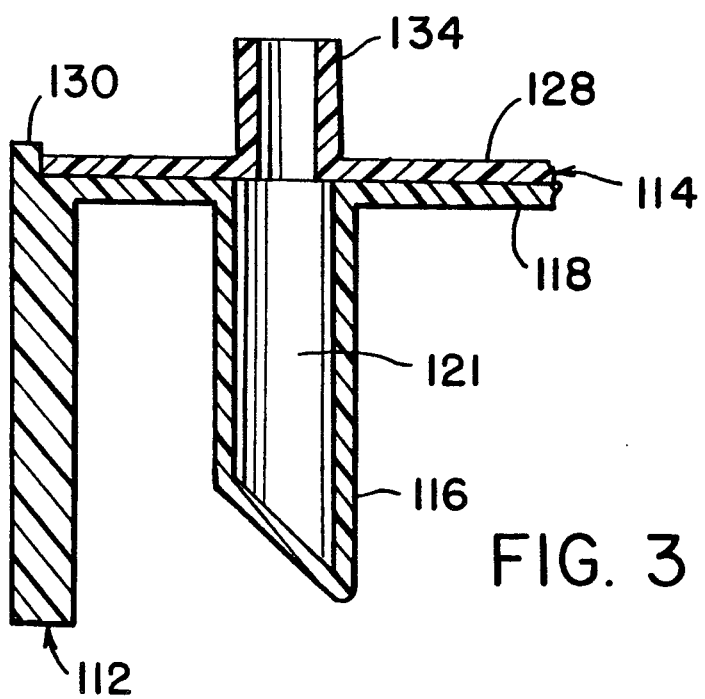
FIG. 3 is a cross-sectional view of a multiple cavity lipstick mold constructed in accordance with an alternate embodiment of the present invention.
Figure 4:
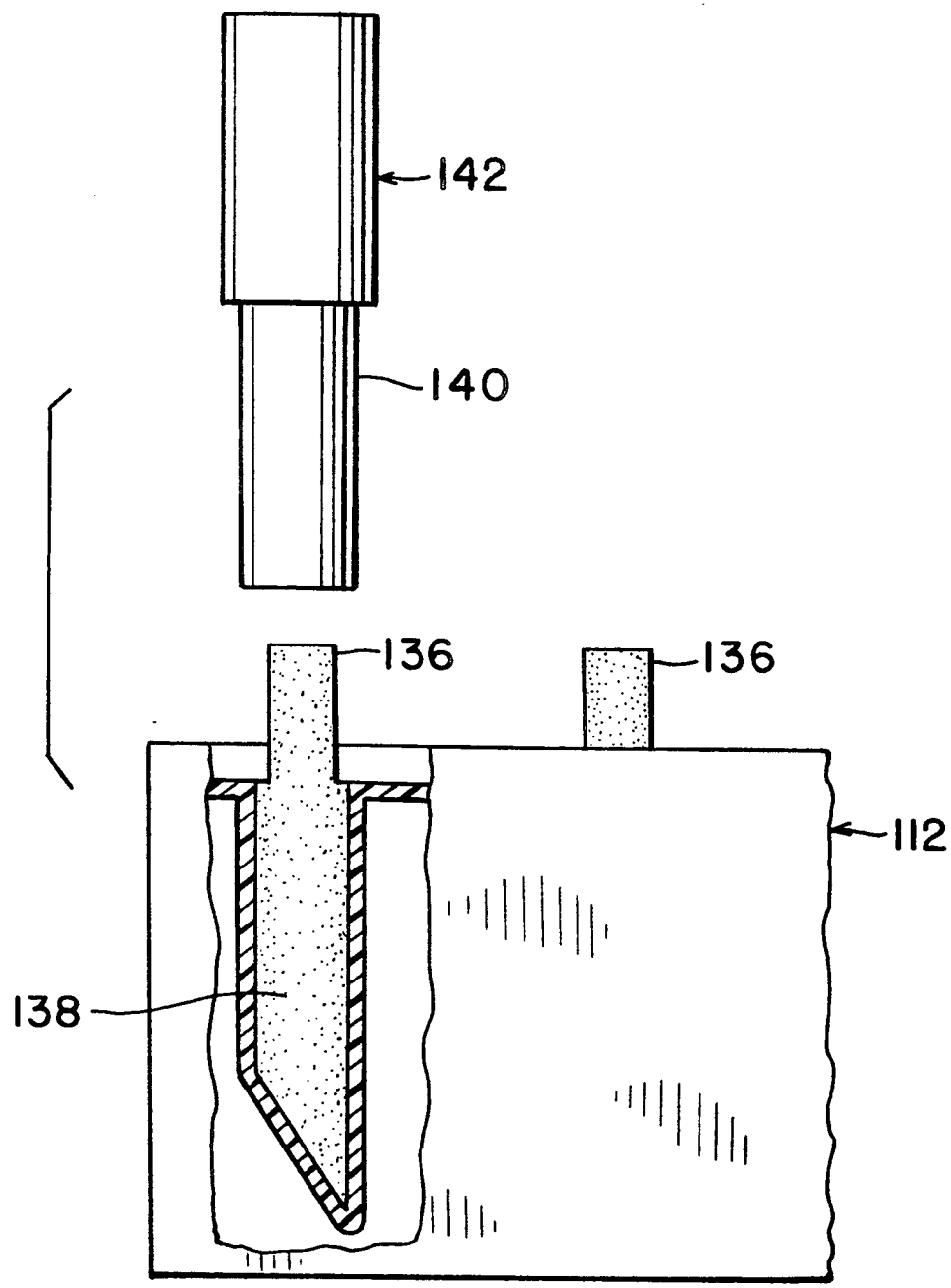
FIG. 4 is a side elevational view of a lipstick container and the multiple cavity lipstick mold illustrated in FIG. 3, a section of the multiple cavity lipstick mold being removed to show a lipstick product molded there.

Another exemplary embodiment of a multiple cavity lipstick mold constructed in accordance with the present invention is illustrated in FIGS. 3 and 4. Elements illustrated in FIGS. 3 and 4 which correspond to the elements described above with respect to the embodiment illustrated in FIGS. 1 and 2 have been designated by corresponding reference numerals increased by one hundred. The exemplary embodiment illustrated in FIGS. 3 and 4 is constructed and operates in the same manner as the embodiment illustrated in FIGS. I and 2 unless otherwise noted.

Referring now to FIG. 3, a cap section 114 of a multiple cavity lipstick mold 110 has tubular projections 134 that extend away from a base 112. Since the tubular projections 134 do not insure the proper orientation of the base 112 with respect to the cap section 114, a base plate 118 is provided with a peripheral retainer lip 130, which slideably receives and embraces the cap section 114. The peripheral retainer lip 130 insures that the tubular projections 134 of the cap section 114 are coaxially oriented with cavities 121 of receptacles 116. The face plate 128 of the cap section 114 and the base plate 118 of the base 112 must meet tightly to prevent leakage of the lipstick melt into a space between them. Peripheral sealing lips and/or mating peripheral grooves (not shown) could be provided around the bores 132 of the tubular projections 134 and/or the cavities 121 of the receptacles 116 at their juncture to accomplish sealing if the viscosity of the lipstick compound so dictates. To fill each cavity 121 with melted lipstick, a multi-port charging device (not shown) can be used. Such a device includes a plurality of discharge ports matching the spacing of the plurality of projections 134 in the cap section 114. To charge the mold 110, the tubular projections 134 are aligned with the ports and valves, which release metered amounts of the melt into the cavities 121. Such devices for simultaneously filling a plurality of receptacles are well known in the cosmetic industry.

Referring now to FIG. 4, a butt end 136 of a lipstick product 138 is dimensioned to be received in and frictionally retained by a barrel 140 of a conventional telescopic lipstick container or holder 142. The butt end 136 has an outer diameter which is slightly less than the inner diameter of the barrel 140 so that the barrel 140 can be inserted onto the butt end 136 of the lipstick product 138 for a purpose which will be described hereinafter.

Figure 5:
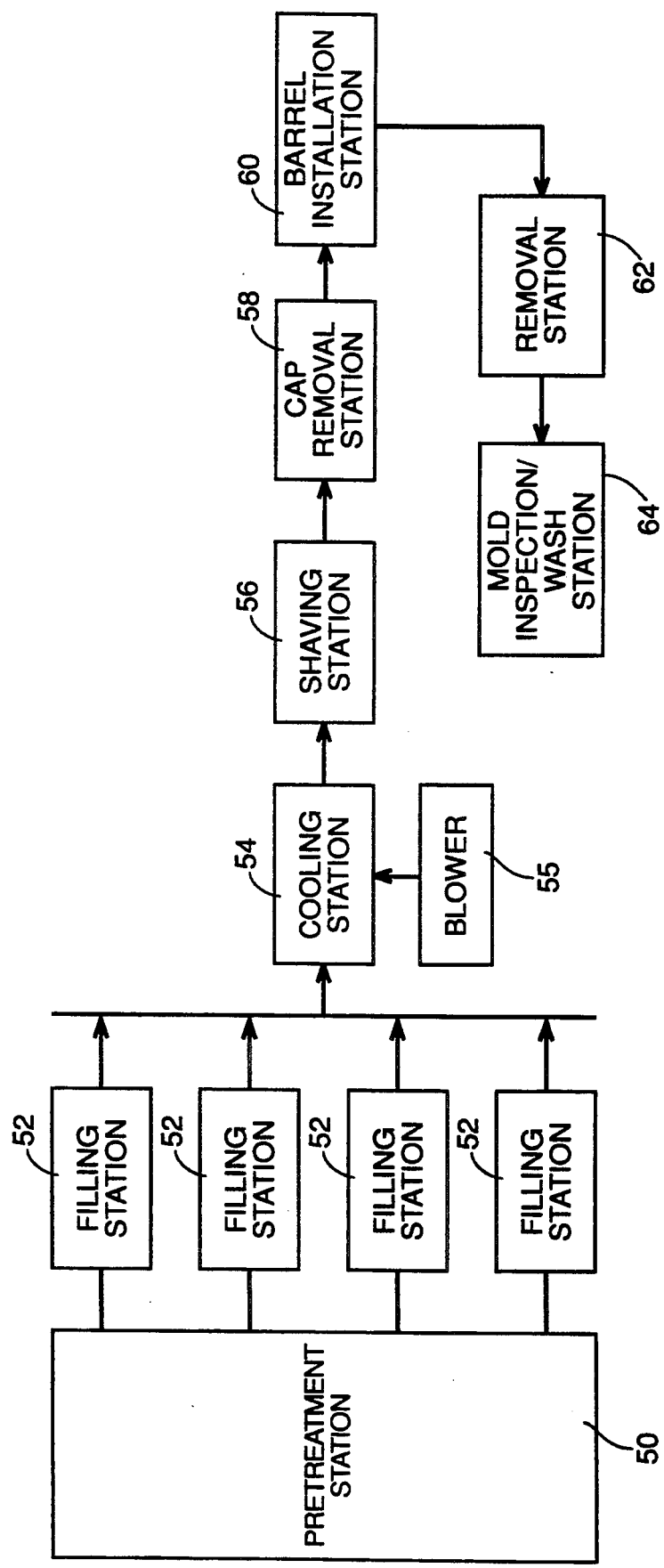
FIG. 5 is a schematic diagram of a process for manufacturing lipstick using the multiple cavity lipstick mold illustrated in FIGS. 1 and 2.

Referring now to FIG. 5, a schematic diagram illustrates the steps required to manufacture lipstick products using the mold 10 illustrated in FIGS. 1 and 2. The manufacturing process begins at a pretreatment station 50, where the base 12 and cap section 14 are chemically treated and then attached together. To prevent the lipstick products from adhering to the receptacles 16, and to give the molded lipstick products uniform finishes, the cavity 21 of each receptacle 16 is exposed to a halogenated gas in accordance with a process disclosed in the patent application of KAMEN ET AL., U.S. patent Ser. No. 07/400,834, filed Aug. 30, 1989, now U.S. Pat. No. 5,108,667, and entitled "PROCESS FOR THE TREATMENT OF POLYMER COSMETIC MOLDS AND THE MOLDED COSMETIC PRODUCTS OBTAINED THEREWITH", which is owned by the assignee of the present application and which is incorporated herein by reference. If desired, the bores 32 of the projection 34 can also be halogenated. The halogenation of the mold 10 is advantageous because it can eliminate the need to flame the lipstick products.

The assembled mold 10 is sent to a filling station 52 where melted lipstick bulk is poured into the cavities 21 of the receptacles 16. A plurality of filling stations 52 are shown to indicate that a number of molds are filled simultaneously. At each of the filling stations 52, a melted lipstick formulation is poured onto the face plate 28 of the cap section 14. The peripheral lip 30, which rises above the face plate 28, defines a pan-like receptacle for receiving and containing the melted lipstick bulk. The melted lipstick bulk flows over the face plate 28 and through the bores 32, thereby filling the cavities 21 of the receptacles 16 and the bores 32 of the face plate 28. Although it is desirable to carefully meter the melted lipstick bulk to eliminate waste, any excess melt that is retained in the pan-like upper surface may be shaved off in a subsequent step, which is discussed hereinafter. A metering system used for dispensing lipstick melt into the mold 10 must be sufficiently accurate to prevent overfilling and the associated necessity of scraping away excess lipstick. Thus, an accurate metering system saves time, machinery, and manpower that would otherwise be spent on the step of scraping away excess lipstick product.

After having filled the cavities 21 of the receptacles 16 and the bores 32 of the face plate 28 with melted lipstick bulk, the mold 10 is then sent to a cooling station 54, where the melted lipstick bulk is allowed to cool and solidify into the lipstick products. The molded lipstick products must be cooled sufficiently so that the melt assumes at least a semi-solid state prior to shaving and the lipstick products are structurally strong prior to removal of the cap section 14. Cooling of the mold 10 is achieved by delivering a coolant through the access openings 26 and into the chamber 27, where the coolant circulates or otherwise flows in, over and around the receptacles 16. The coolant can be refrigerated air, a refrigerant gas or any other suitable cooling medium. If air is selected as the coolant, cooling is achieved by blowing the air over the receptacles 16 by a blower 55. The flow rate of the air is sufficient to remove heat from the receptacles 16 by convection. The flow rate can be readily determined by a person skilled in the art given the appropriate design parameters. If refrigerated air is selected as the coolant, the mold can be passed through a refrigerated tunnel. Cooling in this manner permits the tunnel to be maintained at a low temperature at a reasonable cost. By passing the mold 10 through the refrigerated tunnel on a conveyor, the exposure of the mold 10 to the refrigerated air in the tunnel could be timed such that the mold 10 is cooled to the proper temperature upon exiting the tunnel.

If an excess amount of lipstick is poured into the mold 10 causing the excess to remain on the face plate 28 of the cap section 14, it may be necessary to shave the excess lipstick from the face plate 28. This is performed at a shaving station 56. Shaving permits the cap section 14 to be withdrawn from the base 12 without pulling or breaking the solidified lipstick products.

Next, the cap section 14 is removed from the base 12 at the cap removal station section 58. With the cap section 14 removed, the butt ends of the lipstick products protrude partially from the base 12.

Next, at the barrel installation station 60, barrels of conventional telescopic lipstick containers or holders, like the holder 142, are slideably inserted over the partially exposed butt ends of the lipstick products. To slide the barrels over the entire lengths of the butt ends, the barrels must be inserted into the cavities 21. Therefore, the outer diameters of the barrels must be less than the inner diameters of the cavities 21 in the regions adjacent the apertures 22. Although this operation could easily be done by hand, it is far more productive to employ a machine that would carry and orient a plurality of barrels for simultaneous fitting onto the corresponding plurality of protruding butt ends.

Next, at the removal station 62, the lipstick products are withdrawn from the base 12. More particularly, the holders can be pulled away from the base 12 either by hand or by a suitable machine, which is adjusted to grasp a plurality, and preferably all, of the holders. Alternatively, if a receptacle 16 is provided with an air hole (not shown) at its tip 20, a jet stream of air can be blown through the air hole to force the lipstick product out of its cavity 21. After the lipstick products are removed from the base 12, the mold 10 is inspected and washed, if necessary, at a mold inspection/washing station 64. The mold 10 can then be reused.

With the following exceptions, the mold 110 illustrated in FIGS. 3 and 4 Can be used to manufacture lipstick in the same manner as the mold 10 illustrated in FIGS. 1 and 2 Since each butt-end 135 of a lipstick product 138 is fully exposed, the barrel 140 of a lipstick container 142 can be inserted over the entire butt end 136. Therefore, the outer diameter of the barrel 140 is not restricted. Furthermore, since the tubular projections 134 rise above the face plate 128, the excess cosmetic melt does not adhere to the butt ends 136 of the lipstick products 138. Therefore, shaving is not required, and the shaving station 56 can be eliminated.

It will be understood that the embodiments described herein are merely exemplary and that a person skilled in the art may make many variations and modifications without departing from the spirit and scope of the invention. For instance, if the lipstick products do not require butt ends, then the bases 12 and 112 can be employed without the cap sections 14 and 114, respectively. All such modifications are intended to be included within the scope of the invention as defined in the appended claims.

I claim:

1. A multiple cavity mold for forming a plurality of cosmetic lipstick products comprised of a thermoplastic material selected from the group consisting of a polyalkylene having 2 to 8 carbons, polyamide, styrenic, polyacetal, polycarbonate, polyacrylate, polyester, cellulosic, or mixtures thereof, wherein the inner surface of said mold has been halogenated with a plasma treatment gas selected from the group consisting of ethylene tetrafluoride, fluoroethane, silicon fluoride, fluorine, methyl fluoride, or mixtures thereof, wherein said cavities are sized and shaped so as to form lipstick bullets, comprising a base having a substantially hollow interior chamber and a plurality of receptacles depending from said base and extending into said interior chamber thereof, each of said receptacles having an inner surface, which forms a cavity for forming at least a major portion of a cosmetic lipstick product, and an outer surface, which is exposed to said interior chamber of said base; and accessing means comprising at least one opening in a wall of said base for allowing coolant to enter said interior chamber of said base and to contact said outer surfaces of said receptacles, and wherein said mold further comprises a cap section removably mounted on said base, said cap section having a plurality of projections extending outwardly therefrom, each of said projections defining a bore which is in alignment with a corresponding one of said cavities to form a portion of a corresponding cosmetic product.

2. A multiple cavity mold according to claim 1, wherein said accessing means includes a first opening in a first sidewall of said base and second opening in a second sidewall of said base.

3. A multiple cavity mold according to claim 1, wherein said accessing means includes a first opening in a first end wall of said base and a second opening in a second end wall of said base.

4. A multiple cavity mold according to claim 1, wherein said accessing means includes at least one opening in a bottom of said base.

5. A multiple cavity mold according to claim 1, wherein each of said projections extends from said cap section toward said base and is located internally of a corresponding one of said cavities.

6. A multiple cavity mold according to claim 5, further comprising aligning means for automatically aligning said bores with said cavities.

7. A multiple cavity mold according to claim 6, wherein said aligning means includes said projections and said cavities.

8. A multiple cavity mold according to claim 1, wherein each of said projections extends from said cap section away from said base and is positioned externally of a corresponding one of said cavities.

9. A multiple cavity mold according to claim 8, further comprising aligning means for automatically aligning said bores with said cavities.

10. A multiple cavity mold according to claim 9, wherein said aligning means includes a peripheral lip provided on said base and a peripheral edge provided on said cap section, said peripheral edge of said cap section contacting said peripheral lip of said base along substantially their entire lengths.

11. A multiple cavity mold according to claim 1 wherein each of said receptacles has a monolithic construction, whereby said products are seamless.

12. A method of manufacturing a plurality of cosmetic products using a multiple cavity mold comprised of a thermoplastic material selected from the group consisting of a polyalkylene having 2 to 8 carbons, polyamide, styrenic, polyacetal, polycarbonate, polyacrylate, polyester, cellulosic, or mixtures thereof, wherein the inner surface of said mold has been halogenated with a plasma treatment gas selected from the group consisting of ethylene tetrafluoride, fluoroethane, silicon fluoride, fluorine, methyl fluoride, or mixtures thereof, said method comprising the steps of:

(i) providing a base with a substantially hollow interior chamber and a plurality of receptacles depending from said base and extending into said interior chamber, and a cap section with projections, (ii) providing accessing means comprising an opening in a wall of said base, (iii) placing the cap section on the base and filling each cavity of the mold with a quantity of cosmetic melt, (iv) flowing a coolant through the accessing means into the interior chamber of the base to contact the outer surfaces of the receptacles to thereby solidify the cosmetic melts and form the products; and (v) removing said products from the mold.

13. A method according to claim 12, wherein a number of multiple cavity molds are filled simultaneously and then transported to a cooling station for the performance of step (iv).

14. A method according to claim 12, wherein said coolant flows through the interior chamber of the base from one end of the mold to an opposite end of the mold.

15. A method according to claim 12, wherein said coolant flows through the interior chamber of the base from one side of the mold to an opposite side of the mold.

16. A method according to claim 12, wherein said coolant flows into the interior chamber of the base through an opening in the bottom thereof.

17. A method according to claim 12, wherein each cavity of the mold is sized and shaped so as to form a lipstick bullet.

* * * * *